United States Patent

Noshita et al.

[11] Patent Number: 5,806,170
[45] Date of Patent: Sep. 15, 1998

[54] APPARATUS FOR ASSEMBLING AND DISASSEMBLING STATOR WINDING OF DYNAMO-ELECTRIC MACHINE

[75] Inventors: Yoshiteru Noshita, Yokosuka; Tadashi Washizuka, Kawasaki; Shigehiro Hayashi, Yokohama; Katsune Zaitsu, Yokohama; Kazuo Tashiro, Yokohama, all of Japan

[73] Assignee: Kabushiki Kaisha Toshiba, Kawasaki, Japan

[21] Appl. No.: 541,702

[22] Filed: Oct. 10, 1995

[51] Int. Cl.⁶ .................................................. H02K 15/06
[52] U.S. Cl. ................................. 29/596; 29/606; 29/732; 29/736; 29/762
[58] Field of Search .............................. 29/732, 736, 762, 29/596, 606

[56] References Cited

U.S. PATENT DOCUMENTS

| | | | |
|---|---|---|---|
| 4,621,850 | 11/1986 | Wiersema et al. | 29/762 X |
| 5,619,787 | 4/1997 | Couture et al. | 29/732 X |

Primary Examiner—Carl E. Hall
Attorney, Agent, or Firm—Oblon, Spivak, McClelland, Maier & Neustadt, P.C.

[57] ABSTRACT

At a time of disassembling and assembling stator windings of a dynamo-electric machine in which the stator windings fitted in slots formed to an inner periphery of a stator core disposed inside a stator frame are disassembled therefrom and conveyed outside the stator core successively and new stator windings are then conveyed into the stator core and assembled into the slots successively, a mounting apparatus is arranged between the slot and an inside conveyer for mounting the stator winding into the slot. The stator winding is disassembled from the slot into which the stator winding is inserted while receiving and holding the stator winding by a receiving member provided for the mounting apparatus. The stator winding is then moved to the inside conveyer from the mounting apparatus and then conveyed from the inside conveyer to an outside conveyer. The described disassembling steps in the described order are repeated until a predetermined number of stator windings have been disassembled from corresponding slots and conveyed outside the stator core. Next, the stator winding assembling steps are carried out by steps substantially reverse to those described above till a time when a predetermined number of slots are assembled with the new stator windings.

14 Claims, 13 Drawing Sheets

5,806,170

APPARATUS FOR ASSEMBLING AND DISASSEMBLING STATOR WINDING OF DYNAMO-ELECTRIC MACHINE

BACKGROUND OF THE INVENTION

The present invention relates to method and apparatus for assembling and disassembling a stator winding of a dynamo-electric machine particularly adapted for field-work in an electric power plant at a time of changing stator windings each having heavy weight.

In general, a stator winding and other components of a dynamo-electric machine are assembled through complicated processes, and in a manufacturing plant, these components are assembled by using dedicated crane and conveying apparatus, or specific apparatus. However, in recent years, there is increased cases where an insulating performance of the stator windings has been degraded in accordance with time elapsing and, hence, the stator windings are to be changed with new ones.

FIG. 10 shows a general structure of a stator of a dynamo-electric machine, FIG. 11 shows an outer appearance of a stator winding, and FIG. 12 is a perspective view for explaining assembling the stator winding to the stator core at the working field.

Referring to these figures, a stator frame is denoted by a reference numeral 1 and a reference numeral 2 denotes a stator core, to which are formed a plurality of slots 3 into which lower and upper stator windings 4 (4a and 4b) are inserted. Stator winding wedge members 8 are further inserted into the slots 3, outside these stator windings 4a and 4b, for fixing them assembled in the slots 3. These windings each has relatively heavy weight.

FIG. 13 shows a flow-chart showing steps of an actual field working, and with reference to this figure, stator winding assembling steps are described hereunder.

First, a temporary housing is settled at a portion external of the stator frame, generally, on a collector side, and a temporary setting table 6 is located in the temporary housing 5 (steps A1 and A2).

In a case where a generator having the stator core 2 having a large diameter is handled, as shown in FIG. 12, a scaffold 7 is arranged so that a plurality of workers can enter into the stator core 2 (step A3).

Upon the completion of these preliminary steps, the stator winding wedge members 8 are removed from the slots 3 by the workers in a narrow space inside the stator core 2 before disassembling the stator windings 4. Temporary wedge members 9 are ones which are temporarily inserted into the slots 3 after the removal of the stator winding 4a (step A4). Thereafter, the heavy upper stator windings 4a are carried by the workers out of the stator frame 1, or the heavy upper stator windings 4a are suspended down from the slots and withdrawn one by one from the slots 3 and conveyed out by the workers along the axially longitudinal direction of the stator core 2 (step A5).

After the disassembling of the upper stator windings 4a in all the slots 3 has been completed, the lower stator windings 4b are then disassembled and conveyed out of the stator frame 1 by the workers (step A6).

It is natural, without further comment, before the disassembling of these stator windings 4, to disconnect, cut or decompose electric connection or mechanical connection between end portions of the respective stator windings 4.

When new stator windings 4 are composed or assembled, necessary numbers of the new stator windings 4 are conveyed on the temporary setting table 6 at respective times and the lower stator windings 4b are first carryed and inserted into the slots 3 in the stator core 2 by the workers (step A7). Then, the upper stator windings 4a are inserted into the slots 3, respectively, and thereafter, the stator winding wedge members 8 are piled into the slots 3 for fixing the stator windings 4 (4a, 4b) therein (steps A8 and A9).

However, in the disassembling working of the stator windings as mentioned above requires physically hard workings for the workers and also involves dangerous workings, including suspension working, conveying working, or the like because the heavy stator windings are handled in a narrow space inside the stator core by many workers.

That is, the stator winding of a dynamo-electric machine of large capacity each generally has a weight of about 980–1981 N(Newton), and moreover, there are many restrictions for the working environment in the narrow inside space of the stator core. When the workers work in such narrow inside space of the stator core, it is necessary for the workers to take an unnatural attitude for conveying in or out the heavy windings and the like, which is dangerous and requires severe physical conditions for the workers for suspending, conveying or handling of the heavy windings in the stator core. Therefore, in the prior art, the disassembling and assembling of the stator windings requires much time and much labor for many workers in a severe environmental condition, providing significant problems.

SUMMARY OF THE INVENTION

An object of the present invention is to substantially eliminate defects or drawbacks encountered in the prior art and to provide a method and apparatus for disassembling and assembling stator windings of a dynamo-electric machine capable of avoiding dangerous working in a stator core for workers and carrying out the disassembling and assembling workings with less number of workers with less labour.

This and other objects can be achieved according to the present invention by providing, in one aspect, a method of disassembling and assembling stator windings of a dynamo-electric machine in which the stator windings fitted in slots formed to an inner periphery of a stator core disposed inside a stator frame are disassembled therefrom and conveyed outside the stator core successively and new stator windings are then conveyed into the stator core and assembled into the slots successively, the method comprising the steps of:

disposing an outside conveying means outside the stator frame;

disposing an inside conveying means inside the stator frame;

arranging a mounting means between the slot and the inside conveying means for mounting the stator winding into the slot and dismounting it therefrom;

disassembling the stator winding from the slot into which the stator winding is inserted while receiving and holding the stator winding by the mounting means;

moving the stator winding to the inside conveying means from the mounting means;

conveying the stator winding from the inside conveying means to the outside conveying means;

repeating the above mentioned disassembling steps in the described order till a time when predetermined number of stator windings have been disassembled from corresponding slots and conveyed outside the stator core;

placing a new stator winding on the outside conveying means;

conveying the new stator winding to the inside conveying means disposed in the stator core;

moving the new stator winding to a position at which the new stator winding is to be assembled in the slot while receiving and holding the same by the mounting means;

assembling the new stator winding in the slot; and repeating the above mentioned assembling steps in the described order till a time when a predetermined number of slots are assembled with the new stator windings.

In another aspect of the present invention, there is provided an apparatus for disassembling and assembling stator windings of a dynamo-electric machine in which the stator windings fitted in slots formed to an inner periphery of a stator core disposed inside a stator frame are disassembled therefrom and conveyed outside the stator core successively and new stator windings are then conveyed into the stator core and assembled into the slots successively, the apparatus comprising:

an inside conveying means disposed inside the stator core for conveying the stator winding outside the stator core; and a mounting means disposed between the slot and the inside conveying means for mounting the stator winding into the slot and dismounting it therefrom, said stator winding mounting means being provided with a moving mechanism for moving the mounting means between the slot and the inside conveying means and a receiving means for holding the stator winding disassembled from the slot or stator winding to be assembled in the slot.

In preferred embodiments of this aspect, the receiving means includes a positioning means for positioning the stator winding with respect to the slot into or from which the stator winding is inserted or withdrawn and a pushing means for pushing the stator winding into the slot from the position positioned by the positioning means or pushing down the stator winding from the slot to the position positioned by the positioning means. The mounting means is provided with a direction changing mechanism for changing a front end portion of the mounting means to a position adapted to a slot into which the stator winding is inserted or from which the stator winding is withdrawn. The direction changing mechanism is adapted to rotate the front end of the mounting means along an inner periphery of the stator core, and the direction changing mechanism is an arm member rotatable with a central portion on a diameter direction of the stator core being fulcrum of the rotation. The arm member is driven by a rod-less cylinder to which the stator winding means is mounted.

There is further disposed a drive mechanism for driving the inside conveying means in a vertical direction in the stator core to a position substantially to a level at which an axial line of the stator core lies. A temporary bed is further disposed inside the stator core and the inside conveying means is placed on this temporary bed. The temporary bed is divided into a plurality of temporary bed sections and a plurality of the inside conveying means are disposed on some of the temporary bed sections.

The stator winding mounting means comprises moving devices mounted to both axial end portions of the stator frame, each of the moving devices comprising vertically and horizontally movable members for vertically and horizontally moving the stator winding, respectively, from the slot to the inside conveying means and a receiving device provided for the moving device for receiving the stator winding. A guide rod is attached to the vertically movable member, and the stator winding receiving device is provided for the guide rod. The stator winding receiving device is provided with a stator winding receiving portion and means for changing a receiving angle of the receiving portion. The receiving device includes a positioning means for positioning the stator winding with respect to the slot into or from which the stator winding is inserted or withdrawn and a pushing means for pushing the stator winding into the slot from the position positioned by the positioning means or pushing down the stator winding from the slot to the position positioned by the positioning means.

There is further disposed an outside conveying means disposed outside the stator frame for conveying the stator winding in and out of the stator core and is provided with means for adjusting a height thereof.

Further, it is to be noted that the term "upper" and "lower" for the stator windings are used therein to mean that the "upper" means "outside" and the "lower" means "inside with respect to the inserted state in the slots.

According to the present invention described above, the stator winding is disassembled from the slot into which the stator winding is inserted while receiving and holding the stator winding by the mounting means, and the stator winding is transferred to the inside conveying means from the mounting means. The stator winding is then conveyed from the inside conveying means to the outside conveying means. These steps are repeated in the described order till a time when predetermined number of stator windings has been disassembled from corresponding slots and conveyed outside the stator core. In an assembling steps, a new stator winding is placed on the outside conveying means and conveyed to the inside conveying means disposed in the stator core. The new stator winding is moved to a position at which the new stator winding is to be assembled in the slot while receiving and holding the same by the mounting means. The the new stator winding is thus assembled in the slot. These steps are repeated in the described order till a time when a predetermined number of slots are assembled with the new stator windings.

Furthermore, the mounting means is disposed between the slot and the inside conveying means for mounting the stator winding into the slot and dismounting it therefrom, the stator winding mounting means being provided with a moving mechanism for moving the mounting means between the slot and the inside conveying means and a receiving means for holding the stator winding disassembled from the slot or stator winding to be assembled in the slot.

As described above, according to the present invention, since the stator winding disassembling and assembling workings can be carried out mechanically or automatically, the severe or hard workings of the workers with unnatural attitudes in a narrow stator core space can be eliminated, thus preventing dangerous hard working and being advantageous for rewinding of the stator windings.

Furthermore, the conveying-in and conveying-out of the stator windings by utilizing mechanical apparatus and devices permits the disassembling and assembling workings to be performed smoothly and precisely in addition to the safety working, and accordingly, the manual suspension working, lifting working and the like working can be effectively reduced or eliminated, thus being advantageous.

According to the present invention, the stator winding disassembling and assembling workings can be done with reduced number of workers who work in the inside space of the stator core.

The nature and further characteristic features or advantages according to the present invention will be made more clear through the following descriptions made with reference to the accompanying drawings.

DESCRIPTION OF THE PREFERRED EMBODIMENTS

Figure 1:
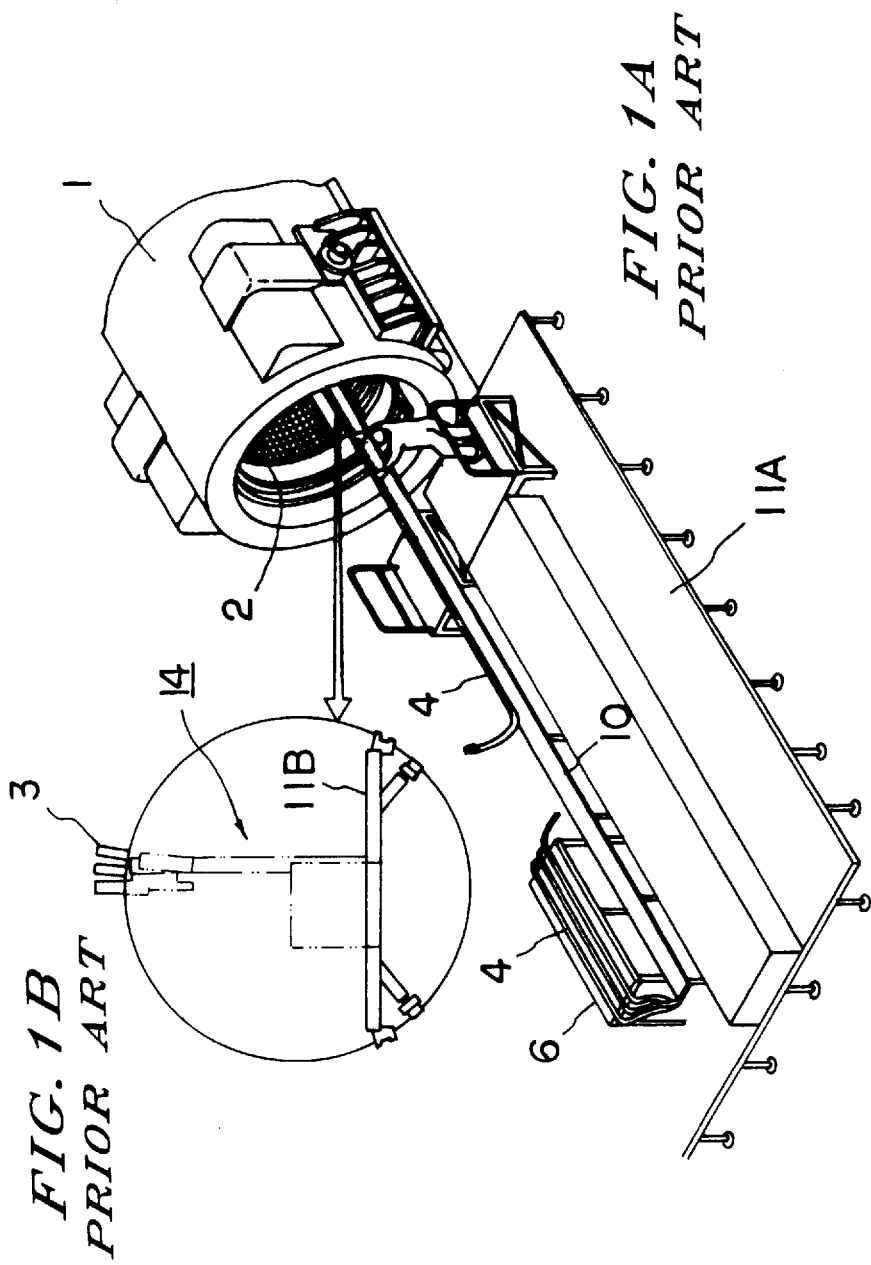
FIG. 1 is a general view showing a first embodiment of the present invention.

A first embodiment according to the present invention will be described hereunder with reference to FIGS. 1 to 5.

Referring to these figures, reference numeral 1 denotes a stator frame and reference numeral 2 denotes a stator core having an inner space. A conveying apparatus 10, such as a roller conveyer, for conveying a stator winding 4 in and out of the stator core 2 is placed on a floor, outside the stator frame 1, on which the stator frame 1 is also settled. The conveying apparatus 10, called an outside conveying apparatus hereinafter, is easily adjustable in its height level so that the level is made substantially equal to that of a temporary bed 11B disposed in the stator core 2 as described hereinafter. The outside conveying apparatus 10 can be also easily disassembled and assembled to provide a desired length or size. The stator windings 4 includes lower stator windings 4b each disposed inside the slot of the stator core 2 and upper stator windings 4a each disposed outside the lower stator winding 4b in the slot 3.

Figure 2:
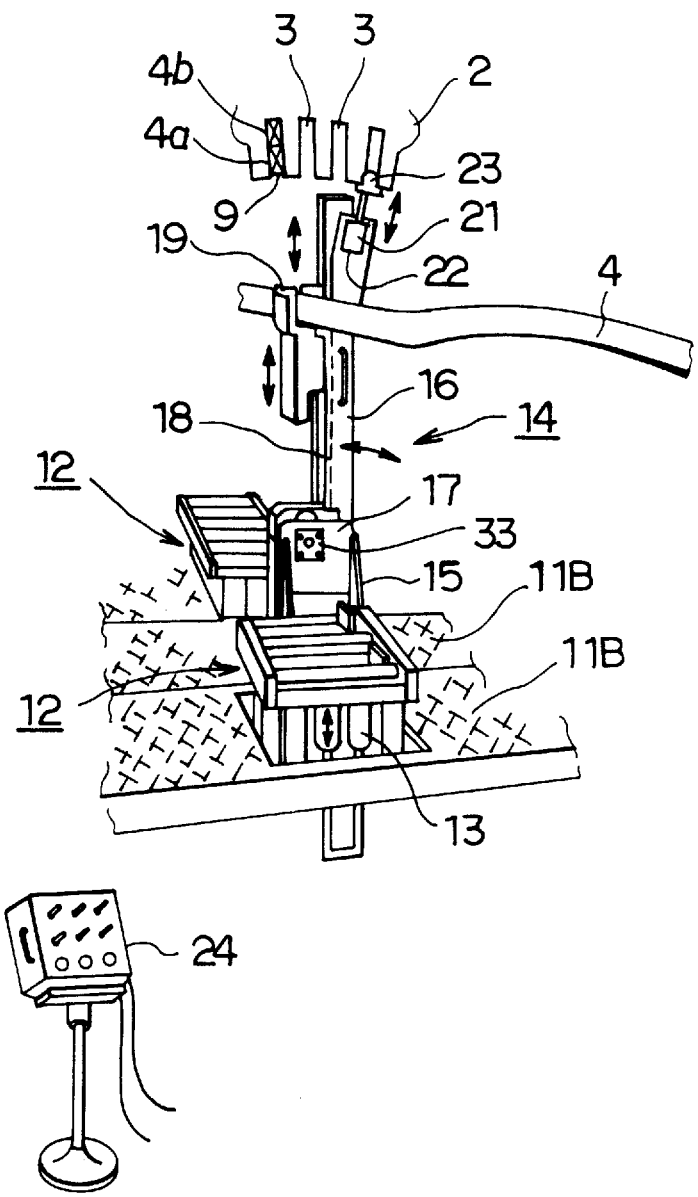
FIG. 2 is a detailed perspective view of an essential portion of a stator winding disassembling and assembling apparatus utilized for the first embodiment.

The temporary bed 11B, composed of a plurality of divided sections 11B, 11B, is placed inside the stator core 2 in a manner protecting the stator core 2. A conveying apparatus 12, called an inside conveying apparatus hereinafter, such as roller conveyer, is also placed on the temporary bed 11B in the stator core 2 as shown in FIG. 2. The inside conveying apparatus 12 is divided into a plurality of sections which are placed on the sections of the temporary bed 11B, and the inside conveying apparatus 12 is provided with a driving mechanism 13 for moving the conveying apparatus 12 to a height level substantially to a level of the central portion of the stator core 2.

In FIG. 1, an encircled view shows an arrangement of the above mentioned devices in the stator core 2 and the details are shown in FIG. 2.

Referring to FIG. 2, a coil, i.e. winding, insertion apparatus 14 is mounted on another section of the temporary bed 11B disposed in the stator core 2, and the coil insertion apparatus 14 is provided with a plurality of vertically movable mechanisms disposed at several portions thereof along the axial direction of the stator core 2 and also provided with an angle changing mechanism capable of optionally changing an angle of the front end along the inner circumferential direction of the stator core 2. This coil insertion apparatus 14 is mounted to the temporary bed 11B in a manner such that a mounting table 15 is first mounted to the temporary bed 11B and an arm member 16 is then attached to the mounting table 15 so that the arm member 16 is rotatable in an arrowed circumferential direction about the axial center of the stator core 2, acting as a fulcrum, by a shaft 33. The movement of the arm member 16 is limited by a stopper member 17. In the above, meaning the coil insertion apparatus 14 may be called a stator winding mounting apparatus.

Figure 4:
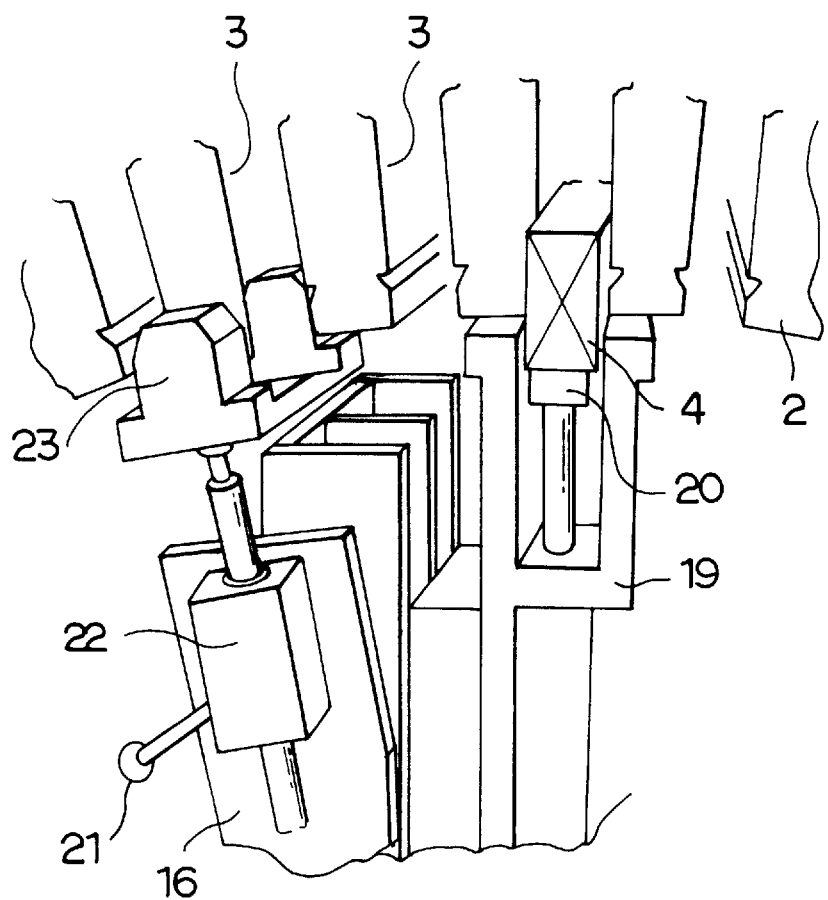
FIG. 4 is a view showing an arrangement of a positioning device and a stator winding pushing device of the apparatus shown in FIG. 2.

A rod-less cylinder 18 driven by compressed air pressure is mounted to the arm member 16 to be movable. A stator winding receiver 19 is attached to the front end of the movable portion of the rod-less cylinder 18, and as shown in FIG. 4, a stator winding pushing device 20 is disposed inside the stator winding receiver 19. This stator winding pushing device 20 is driven by a compact size cylinder and adapted to push up or down the stator windings 4 into the slots 3 for inserting or withdrawing them into or from the slots 3.

Furthermore, as shown in FIG. 4, a positioning device 22 is mounted to the side portion of the front end of the arm member 16 together with a fixing block 23 so that the fixing block 23 faces the slot 3 and is fitted thereinto. This positioning device 22 is vertically movable by means of a manual lever 21. In this arrangement, the fixing block 23 and the stator winding pushing device 20 are mounted preliminarily with different angles by 1 to several pitches.

Figure 5:
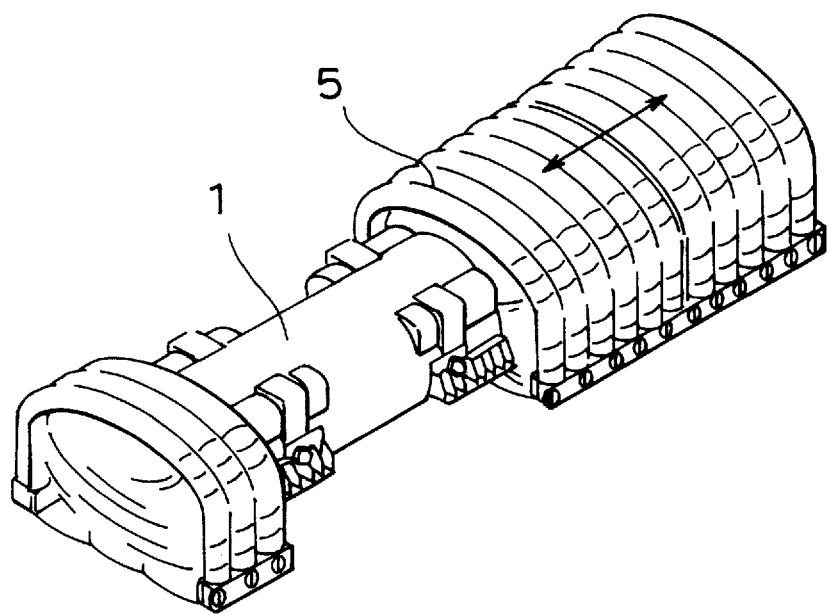
FIG. 5 is a perspective view showing an arrangement of a temporary house.

These apparatus and devices described above are all capable of being driven by an electric power source or compressed air supply source and controlled by a central control board 24. The stator frame 1 is entirely covered by a temporary housing 5, as shown in FIG. 5, to prevent dust or the like from entering into the housing 5. This temporary housing 5 can be set to be movable in a direction shown in FIG. 5.

Figure 6:
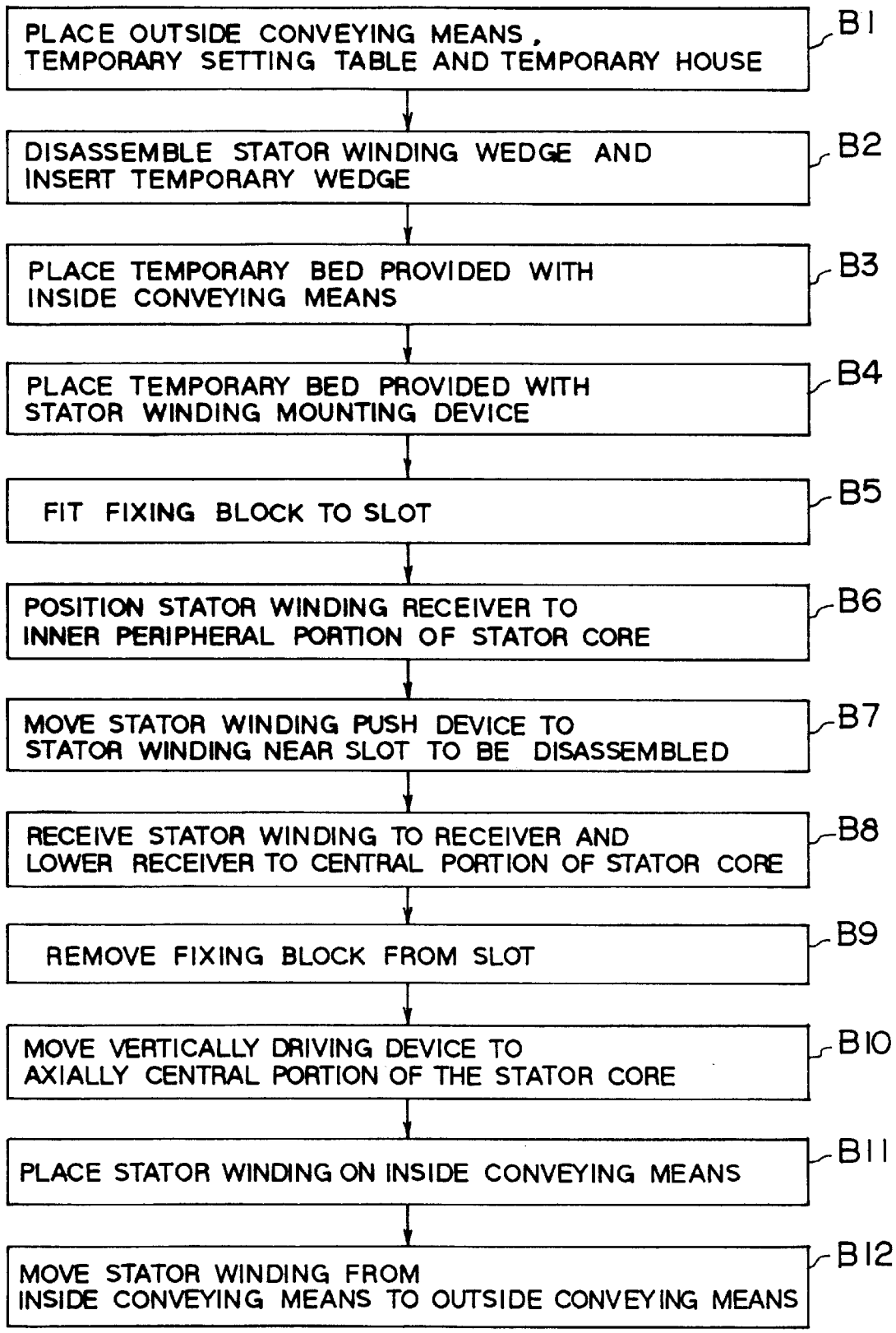
FIG. 6 is a flow-chart representing disassembling steps according to the first embodiment.

The workings or operations for disassembling the stator winding 4 from the stator core 2 and conveying out it therefrom with reference to the flow-chart of FIG. 6.

The outside conveying apparatus 10 is first placed outside the stator frame 1 at a portion near the temporary setting table 6 with the height thereof having been adjusted. The outside conveying apparatus 10 and the temporary setting table 6 are covered by the temporary housing 5 (step B1). When the stator winding 4 is removed from the stator core 2, the stator winding wedge member 8 is removed from the slot 3 and a temporary wedge member 9 is in place inserted thereinto (step B2). Thereafter, the respective apparatus and devices mentioned hereinbefore are arranged in the inside space of the stator core 2, and in the first stage, some of the temporary bed sections 11B to which the divided inside conveying apparatus 12 are mounted are placed in the stator core 2 and, then, other temporary bed sections 11B to which the coil insertion apparatus 14 are mounted are also placed (steps B3 and B4).

In the next step (step B5), the location angle of the arm member 16 is approximately determined, usually manually, in conformity with the position of the slot 3 into which the stator winding 4 to be disassembled is inserted. The lever 21 is then manually operated to fit the fixing block 23 to that slot 3. According to this step B5, the position of this slot 3 is determined.

The rod-less cylinder 18 is moved along the arm member 16 to a portion near the slot 3 and the stator winding receiver 19 is positioned to the inner peripheral portion of the stator core 2. The compact size cylinder is then actuated to move the stator winding pushing device 20 to a portion near the upper stator winding 4a to be disassembled (steps B6 and B7).

In the next step B8, the temporarily assembled wedge member 9 is removed and the upper stator winding 4a is received on the stator winding push-up device 20. The compact cylinder is then actuated to lift down the upper stator winding 4a in the stator winding receiver 19 in the direction arrowed in FIG. 2. Thereafter, the rod-less cylinder 18 is actuated to lower the stator winding receiver 19 together with the stator winding 4a to the central position of the stator core 2 along the arm member 16.

Figure 3:
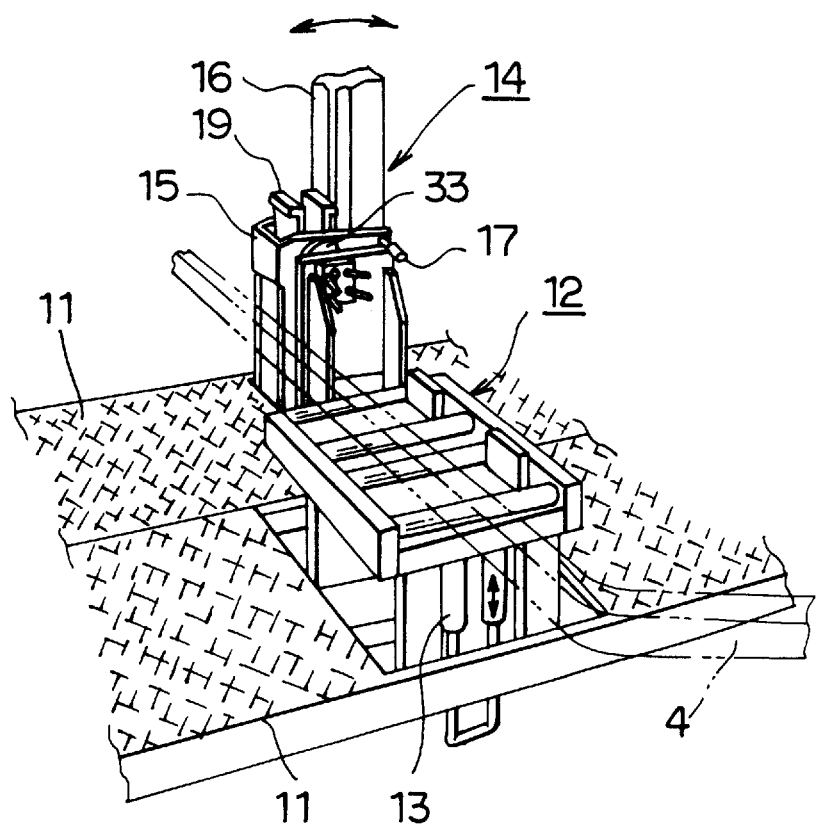
FIG. 3 is a perspective partial view of a stator winding conveying apparatus utilized for the first embodiment.

Then, in the step B9, the manual lever 21 is operated to remove the fixing block 23 from the slot 3 and to return it to the circumferential position of the arm member 16. The driving mechanism 13 is moved to the axially central position of the stator core 2 (step B10), the upper stator winding 4a placed in the stator winding receiver 19 is manually moved in a horizontal direction, and as shown in FIG. 3, the winding 4a is then received by a roller of the inside conveying apparatus 12 (step B11). In the next step B12, the inside conveying apparatus 12 with the stator winding 4a is lowered on the temporary bed 11B, and the stator winding 4a is transferred to the roller of the outside conveying apparatus 10 to convey it outside the stator core 2.

All the upper stator windings 4a fitted into the slots 3 are disassembled and then conveyed out of the stator frame 1 by repeating the steps described above, and all the lower stator windings 4b fitted into the slots inside the upper stator windings 4a are also disassembled and conveyed out of the stator frame 1 by substantially the same manner as that described with respect to the upper stator windings 4a.

According to these steps, since a working for lifting up the heavy stator windings 4 disposed inside the slots 3 positioned to the lower half of the stator core 2 is not needed, the conveying working can be manually performed, thus being advantageous.

Figure 7:
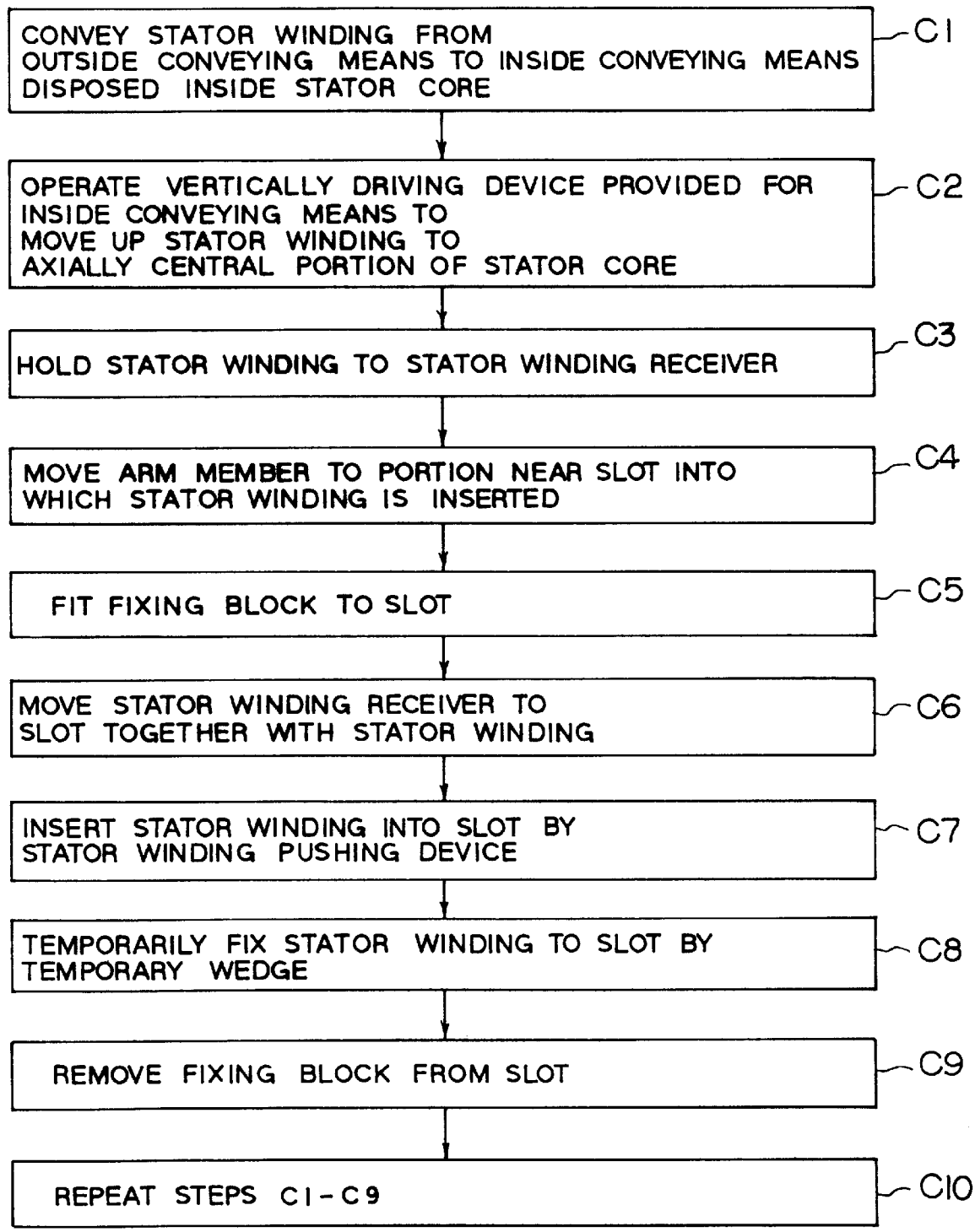
FIG. 7 is a flow-chart representing assembling steps according to the first embodiment.

Workings for assembling new stator windings 4 into the slots 3 of the stator core 2 will be described hereunder with reference to the flow-chart of FIG. 7.

First, in the step C1, the stator windings 4 are transferred to the outside conveying apparatus 10 from the temporary setting table 6, and the stator windings 4 are then manually conveyed on the inside conveying apparatus 12, which is then moved into the stator core 2. When the stator windings 4 have been moved to the predetermined positions in the stator core 2 in the axial direction thereof, the driving mechanism 13 provided for the inside conveying apparatus 12 is driven to push up the stator windings 4 to the height position near the axially central portion of the stator core 2 (step C2). At this time, the height position of the stator winding 4 is adjusted to be in conformity with the upper surface level of the stator winding receiver 19.

Next, in the step C3, the stator winding 4 is slightly moved manually to a position of the stator winding receiver 19, and thereafter, the driving mechanism 13 is lowered, whereby the stator winding 4 is received into the stator winding receiver 19 and held by the stator winding pushing device 20.

The arm member 16 is moved from this state in the circumferential direction and is set to a position near the slot 3 into which the stator winding 4 is inserted (step C4). The manual lever 21 is then operated to move up the positioning device 22, the fixing block 23 is fitted to another slot apart by a predetermined pitch from the slot 3 into which the stator winding 4 is inserted, and the positioning of the stator winding 4 to the slot 3 into which the stator winding 4 is to be inserted is carried out (step C5).

When the position of the stator winding 4 accords with the position of the slot 3 into which that stator winding 4 is inserted, the rod-less cylinder 18 provided for the arm member 16 is actuated to move the stator winding receiver 19 together with the stator winding 4 along the arm member 16 to a position near the slot 3 into which the stator winding 4 is to be inserted (step C6).

Thereafter, the compact size cylinder mounted in the stator winding receiver 19 is actuated, and the stator winding 4 is pushed up by the stator winding pushing device 20 to thereby insert the stator winding 4 into the predetermined slot 3. After the insertion thereof, the stator winding 4 is temporarily fixed in that slot 3 by means of the temporary wedge member 9 (steps C7 and C8).

Upon the completion of the insertion of the stator winding 4, the stator winding pushing device 20 is lowered, and then, the manual lever 21 is operated to remove the fixing block 23 from the slot 3. The positioning device 22 is lowered, the arm member 16 is returned to the vertical position and it is locked by the stopper member 17 (step C9).

All the stator windings 4 will be inserted into the corresponding slots 3, respectively, by repeating the steps described above with reference to FIG. 7 (step C10).

The insertion of the stator windings 4 into the slots positioned below the circumferentially lower half of the stator core 2 is performed manually.

Figure 8:
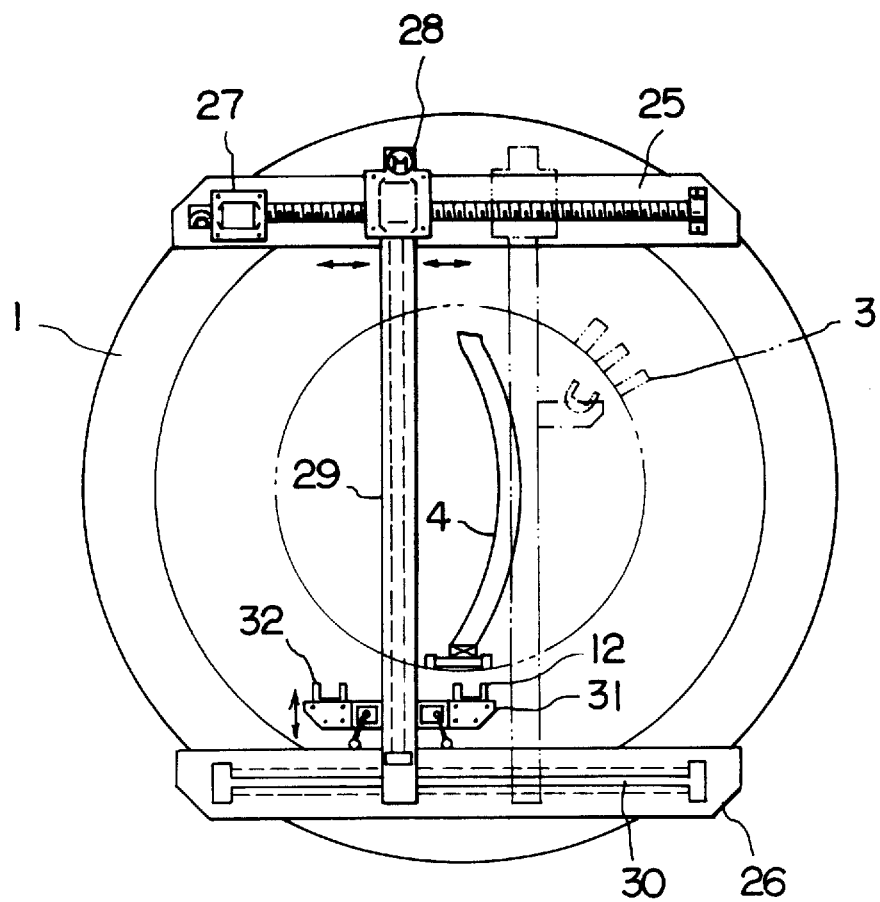
FIG. 8 is a front view of a mounting device according to the second embodiment of the present invention.
Figure 9:
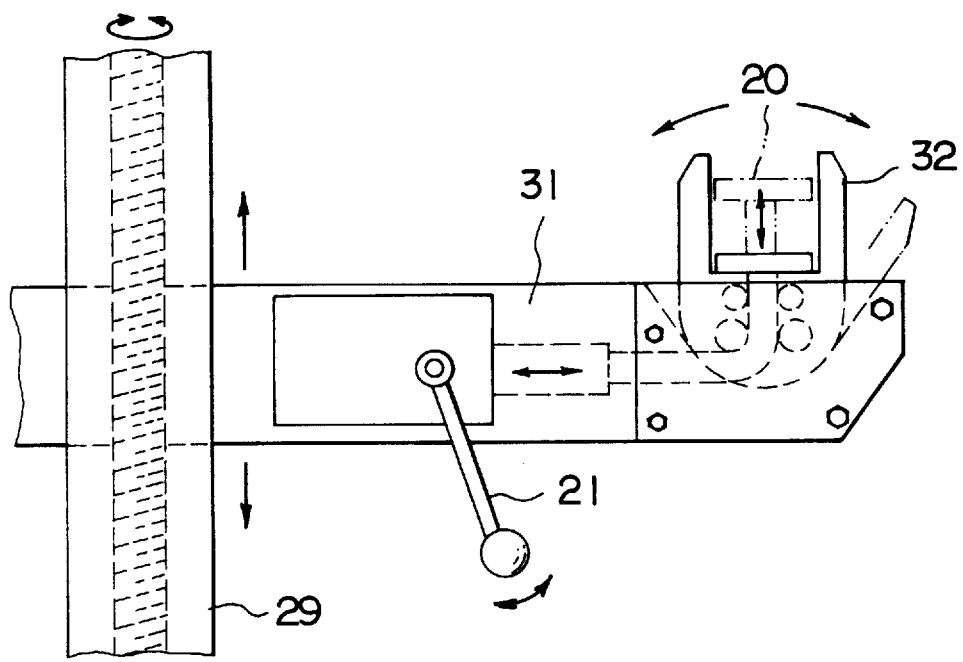
FIG. 9 is a view showing a structure of a stator winding receiving table of the second embodiment.
Figure 10:
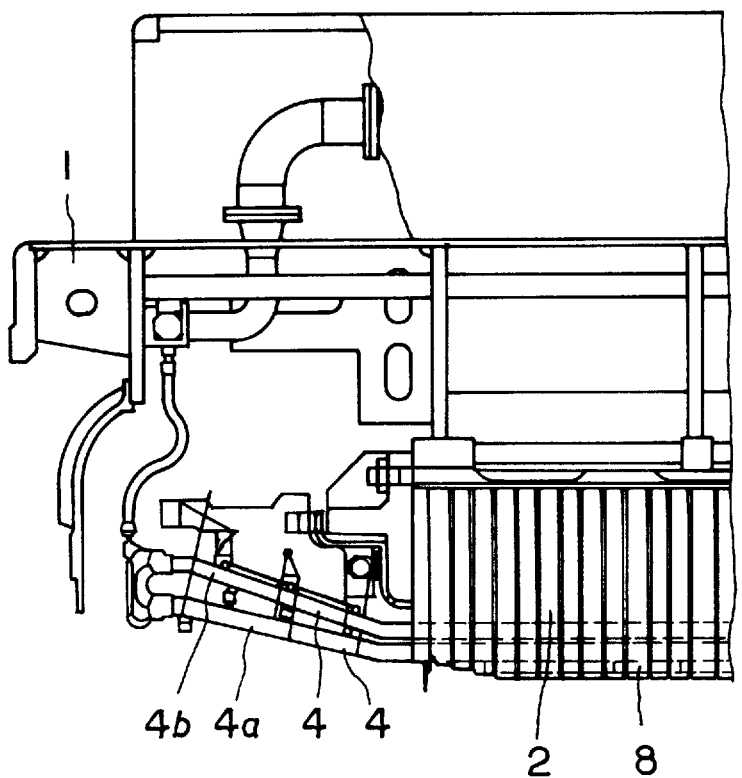
FIG. 10 shows a structure of a stator of a dynamo-electric machine.
Figure 11:
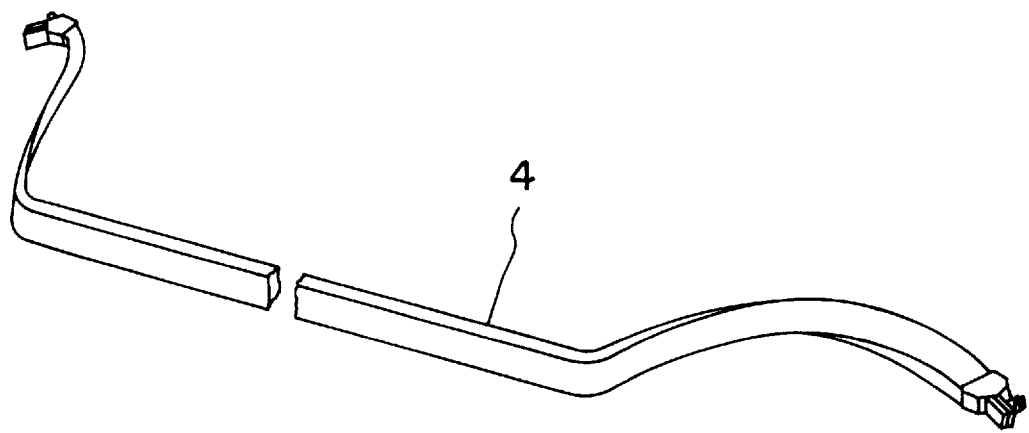
FIG. 11 is a view showing an outer appearance of the stator winding of the stator of FIG. 10.
Figure 12:
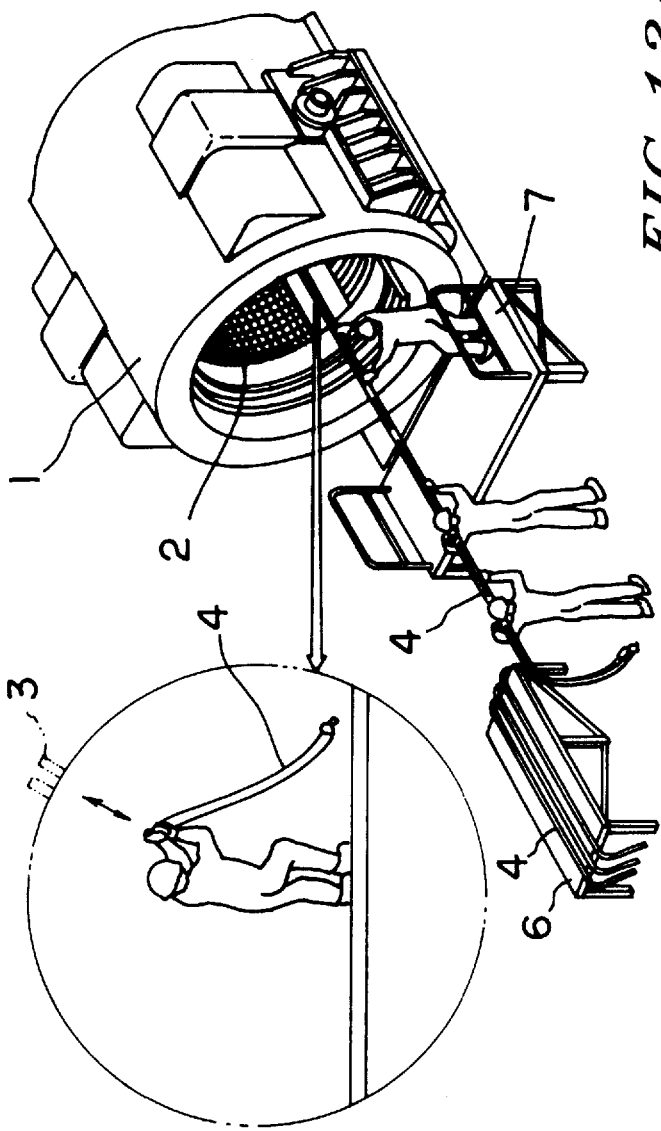
FIG. 12 is a general view showing a conventional example.
Figure 13:
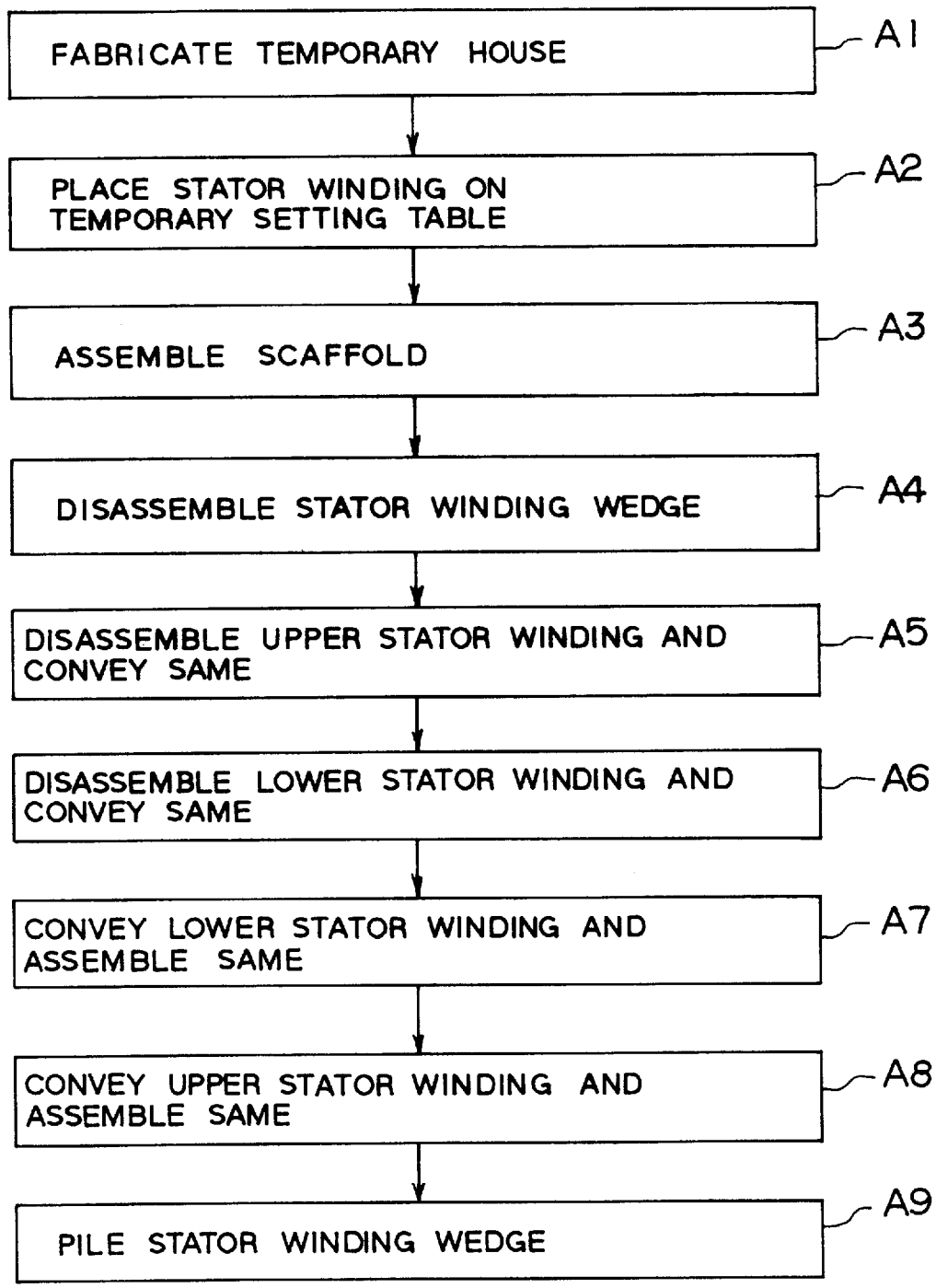
FIG. 13 is a flow-chart showing disassembling and assembling steps according to the conventional art.

A second embodiment of the present invention will be described hereunder with reference to FIGS. 8 and 9.

In the second embodiment, an upper driving apparatus 25 and a lower guide member 26 are attached to both end portions of the stator frame 1 by means of screws engaged with holes formed to surfaces of both the end portions. The upper driving apparatus 25 is provided with a horizontally movable device 27 and a vertically movable device 28. A guide rod 29 is mounted to the vertically movable device 28, and one end portion of the guide rod 29 is fitted to a guide groove 30 formed to the lower guide member 26 by means of a roller.

A stator winding receiving device 31 is mounted to the guide rod 29 and a stator winding receiver 32 is provided for the front end portion of the stator winding receiving device 31. The stator winding receiver 32 has a structure capable of changing its angle by a certain extent for easily fitting the stator winding 4 into the slot 3 formed to the inner periphery of the stator core 2.

Furthermore, a stator winding pushing device 20 driven by an air cylinder or the like is accommodated in the stator winding receiving device 31 so that the front end portion of the stator winding pushing device 20 is positioned inside the stator winding receiver 32. The inside conveying apparatus 12 described with reference to the first embodiment is placed. In such case, however, the driving mechanism 13 can be eliminated and only the roller conveyer will be required.

Since structures or arrangements of the second embodiment other than those described above are substantially identical to those of the first embodiment, the details thereof are omitted herein.

According to the structure described above, the stator winding 4 conveyed in the stator core 2 by the outside conveying apparatus 10 is conveyed manually by the inside conveying apparatus 12 to the predetermined axial position in the stator winding core 2. Then, the stator winding receiver 32 mounted to the front end portion of the stator winding receiving device 31 is moved, by the vertically and horizontally movable devices 28 and 27 to the position of the stator winding 4 now conveyed to receive the same. Thereafter, the vertically and horizontally movable devices 28 and 27 are driven to move the stator winding 4 to a position of a corresponding slot 3 formed to the inner periphery of the stator core 2 into which the stator winding 4 is to be inserted.

In the stator winding receiver 32, the position of the stator winding 4 is manually adjusted so as to accord with the angle of the slot into which the stator winding 4 is to be inserted. Thereafter, the stator winding 4 is inserted into the corresponding slot 3 by operating the stator winding pushing device 20.

According to the second embodiment, the disassembling and assembling of the stator windings of a dynamo-electric machine can be performed as in the first embodiment.

As described hereinbefore through the preferred embodiment, according to the present invention, the disassembling and assembling of the stator windings into the stator core of a dynamo-electric machine can be done by the specific mechanical apparatus with safe manual working, thus being safe and advantageous.

It is to be noted by persons skilled in the art that the present invention is not limited to the described embodiments and many other changes or modifications may be made without departing from the scopes of the appended claims.

What is claimed is:

1. An apparatus for disassembling and assembling stator windings of a dynamo-electric machine in which the stator windings fitted in slots formed at an inner periphery of a stator core disposed inside a stator frame are disassembled therefrom and conveyed outside the stator core successively and new stator windings are then conveyed into the stator core and assembled into the slots successively, the apparatus comprising:

an inside conveying means disposed inside the stator core for conveying the stator winding outside the stator core; and a mounting means disposed in an inside space of the stator core between the slot and the inside conveying means for mounting the stator winding into the slot and dismounting it therefrom, said stator winding mounting means being provided with a moving mechanism for moving the mounting means between the slot and the inside conveying means and a receiving means for holding the stator winding disassembled from the slot or stator winding to be assembled in the slot.

2. An apparatus according to claim 1, wherein said receiving means includes a positioning means for positioning the stator winding with respect to the slot into or from which the stator winding is inserted or withdrawn and a pushing means for pushing the stator winding into the slot from the position positioned by the positioning means or pushing down the stator winding from the slot to the position positioned by the positioning means.

3. An apparatus according to claim 2, wherein said mounting means is provided with a direction changing mechanism for changing a front end portion of the mounting means to a position adapted to a slot into which the stator winding is inserted or from which the stator winding is withdrawn.

4. An apparatus according to claim 3, wherein said direction changing mechanism is adapted to rotate the front end of the mounting means along an inner periphery of the stator core.

5. An apparatus according to claim 4, wherein said direction changing mechanism is an arm member rotatable with a central portion on a diameter direction of the stator core being fulcrum of the rotation.

6. An apparatus according to claim 5, wherein said arm member is driven by a rod-less cylinder to which said stator winding receiving means is mounted.

7. An apparatus according to claim 1, further comprising a drive mechanism for move said inside conveying means in a vertical direction in the stator core to a position substantially to a level at which an axial line of the stator core lies.

8. An apparatus according to claim 1, further comprising a temporary bed disposed inside the stator core and said inside conveying means is placed on said temporary bed.

9. An apparatus according to claim 8, wherein said temporary bed is divided into a plurality of temporary bed sections and a plurality of said inside conveying means are disposed on some of said temporary bed sections.

10. An apparatus according to claim 1, wherein said stator winding mounting means comprises moving devices mounted to both axial end portions of the stator frame, each of said moving devices comprising vertically and horizontally movable members for vertically and horizontally moving the stator winding, respectively, from the slot to the inside conveying means and a receiving device provided for said moving device for receiving the stator winding.

11. An apparatus according to claim 10, further comprising a guide rod attached to said vertically movable member and said stator winding receiving device is provided for the guide rod.

12. An apparatus according to claim 11, wherein said stator winding receiving device is provided with a stator winding receiving portion and means for changing a receiving angle of the receiving portion.

13. An apparatus according to claim 12, wherein said receiving device includes a positioning means for positioning the stator winding with respect to the slot into or from which the stator winding is inserted or withdrawn and a pushing means for pushing the stator winding into the slot from the position positioned by the positioning means or pushing down the stator winding from the slot to the position positioned by the positioning means.

14. An apparatus according to claim 1, further comprising an outside conveying means disposed outside the stator frame for conveying the stator winding in and out of the stator core and is provided with means for adjusting a height thereof.

* * * * *